(12) United States Patent
Ko

(10) Patent No.: US 11,297,968 B2
(45) Date of Patent: Apr. 12, 2022

(54) DRAPERY CARRIER INSTALLATION SYSTEM AND METHOD OF USE

(71) Applicant: Hou Sheng Ko, Irvine, CA (US)

(72) Inventor: Hou Sheng Ko, Irvine, CA (US)

( * ) Notice: Subject to any disclaimer, the term of this patent is extended or adjusted under 35 U.S.C. 154(b) by 55 days.

(21) Appl. No.: 16/433,287

(22) Filed: Jun. 6, 2019

(65) Prior Publication Data

US 2020/0383510 A1    Dec. 10, 2020

(51) Int. Cl.
*A47H 15/04* (2006.01)
*A47H 1/13* (2006.01)
*A47H 13/00* (2006.01)
*B29C 45/00* (2006.01)

(52) U.S. Cl.
CPC ............ *A47H 15/04* (2013.01); *A47H 13/00* (2013.01); *B29C 2045/0086* (2013.01)

(58) Field of Classification Search
CPC . A47H 5/00; A47H 5/03; A47H 15/00; A47H 15/04; A47H 13/00; B29C 2045/0086; E05D 15/26; B61D 19/00; B65D 85/00
USPC ........................................................ 16/93 d
See application file for complete search history.

(56) References Cited

U.S. PATENT DOCUMENTS

| | | | | |
|---|---|---|---|---|
| 3,885,669 A | * | 5/1975 | Potucek | F16B 27/00 206/338 |
| 3,958,691 A | * | 5/1976 | Schaeffer | B65D 73/02 206/326 |
| 4,282,630 A | * | 8/1981 | Toder | A47H 13/00 16/93 D |
| 7,788,769 B2 | * | 9/2010 | Wicker | A47H 15/02 16/87 R |
| 9,717,362 B1 | * | 8/2017 | Birch | A47H 15/02 |
| 2015/0129141 A1 | * | 5/2015 | Kao | A47H 15/02 160/340 |

\* cited by examiner

*Primary Examiner* — Emily M Morgan
(74) *Attorney, Agent, or Firm* — Leavitt Eldredge Law Firm

(57) ABSTRACT

A drapery carrier installation system includes carriers, each having a carrier body and to engage with a track for hanging drapery; an installation rack for holding the carriers relative to one another prior to installation, the installation rack having protrusions for engaging with the carriers; the carriers are secured above the top surface of the installation rack; and the installation rack is removed via a downward or sideways force applied to the installation rack, thereby releasing the installation rack from each of the carriers.

1 Claim, 6 Drawing Sheets

DRAPERY CARRIER INSTALLATION SYSTEM AND METHOD OF USE

BACKGROUND

1. Field of the Invention

The present invention relates generally to ripple drapery systems, and more specifically, to a system and method for installation of a plurality of drapery carriers in a quick and efficient way. The system utilizes an installation track that is engages with a plurality of carriers such that the plurality of carriers are aligned for easy installation in a drapery hanger rack.

2. Description of Related Art

Ripple drapery systems are well known in the art and are effective means to hang drapery. Conventional systems can include a number of devices that engage with a track and/or cable and receive drapery, thereby allowing for the drapery to be opened and closed. Conventionally, drapery carriers are installed one by one into a drapery track, which is time consuming and tedious for the person installing them.

It is an object of the present invention to provide for an installation rack that can be used to install a plurality of drapery carriers simultaneously and efficiently, thereby cutting down on time involved in installation of the drapery.

The present invention will disclose two embodiments of an installation rack that can be easily and efficiently used to install the plurality of drapery carriers, it will be appreciated that minor modifications to the embodiments shown will fall within the scope of this disclosure.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
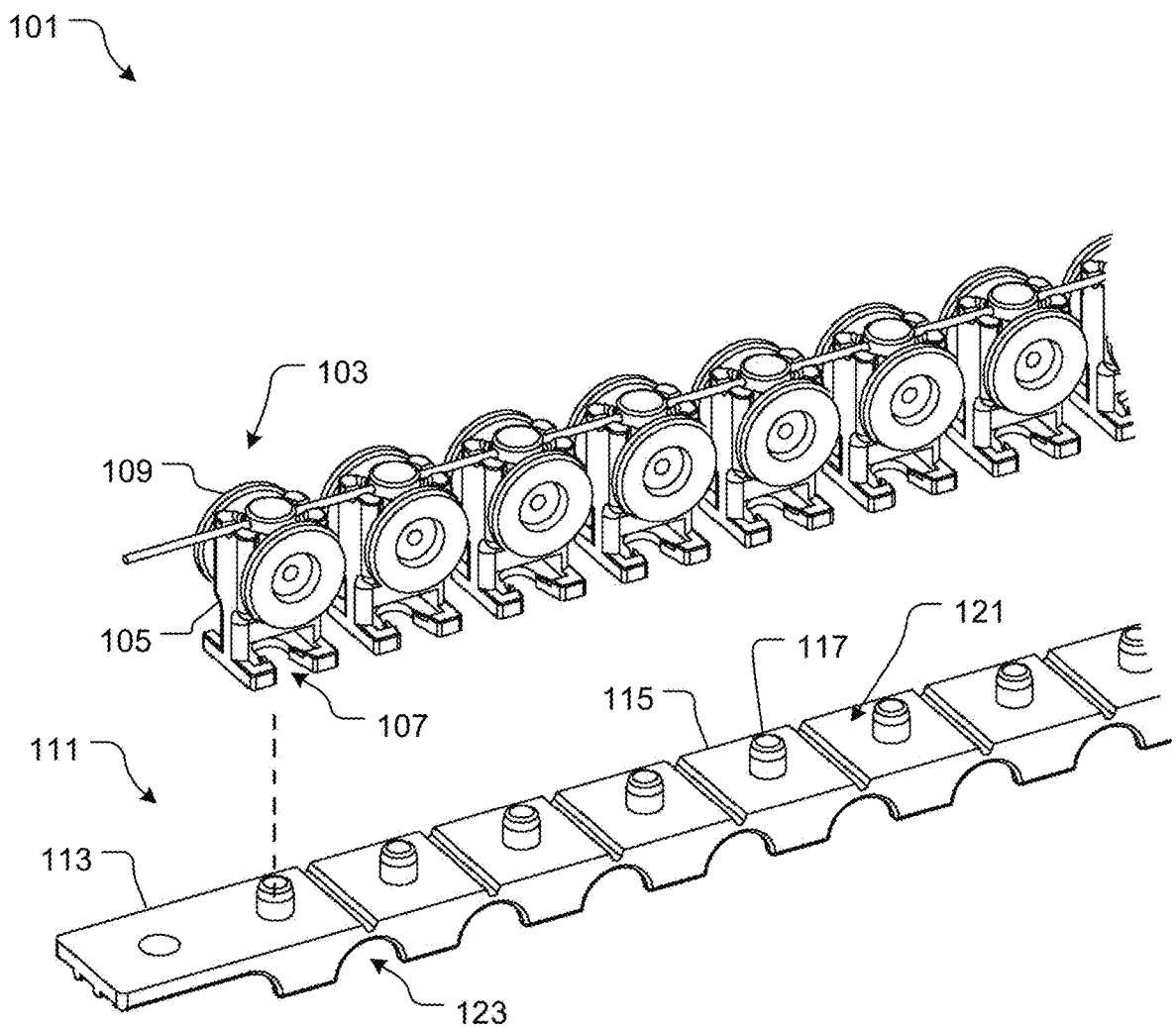
FIG. 1 is an isometric view of a drapery carrier installation system in accordance with a preferred embodiment of the present invention.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional drapery carrier installation systems. Specifically, the present invention utilizes an installation rack to align a plurality of drapery carriers such that the plurality of carriers can be installed within a drapery track simultaneously. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIGS. 1-4 depict various views of a first embodiment of a drapery carrier installation system 101 in accordance with a preferred embodiment of the present application. It will be appreciated that system 101 overcomes one or more of the above-listed problems commonly associated with conventional drapery systems.

Figure 2:
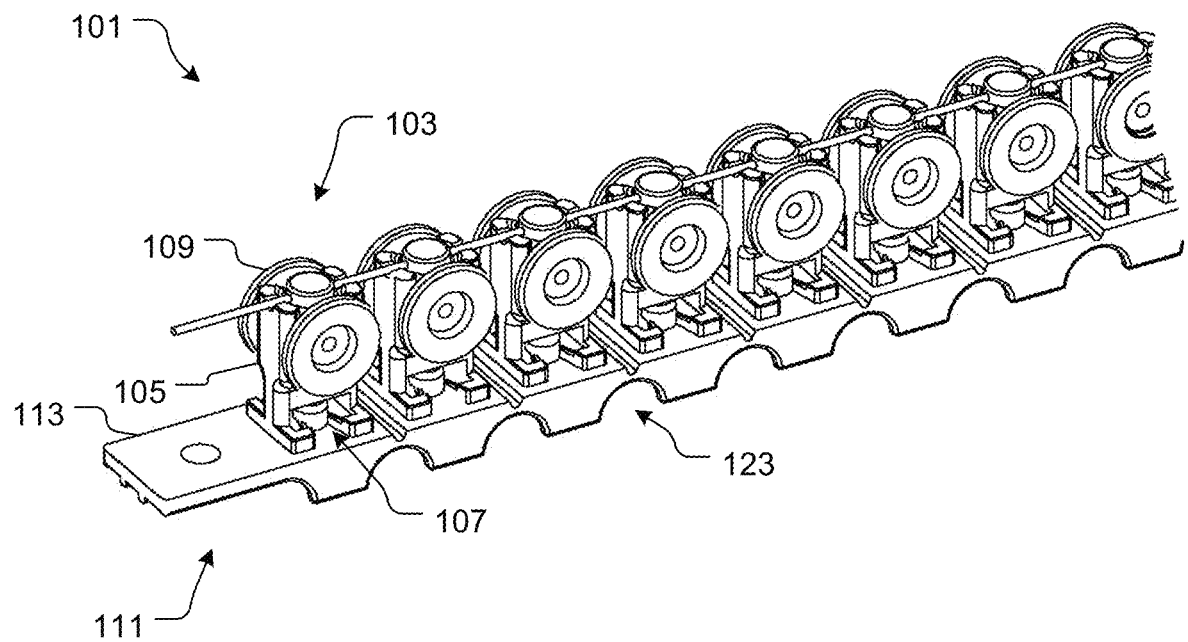
FIG. 2 is an isometric view of the system of FIG. 1 with a plurality of carriers engaged with the installation rack.

In the contemplated embodiment, system 101 includes a plurality of drapery carriers 103 each having a carrier body 105 with one or more grooves 107, and further having one or more wheels 109 to engage with a drapery track 301. In some embodiments, it is contemplated that the carriers can be without wheels depending on the style needed by the user. It should be appreciated that the exact embodiment of the drapery carrier can vary. The installation system 101 further includes an installation rack 111 that is configured to receive and hold the plurality of carriers in an aligned configuration, thereby providing for easy installation. In this embodiment, the installation rack 111 includes a base plate 113 with a plurality of sections 115, each of the plurality of sections 115 having a button 117 extending from a top surface 121. Each button 117 is configured to engage with the groove of the 107 of the carrier body, thereby securing the carrier body to the top surface, as shown in FIG. 2. In some embodiments, the installation rack 111 further includes cutouts 123.

Figure 3:
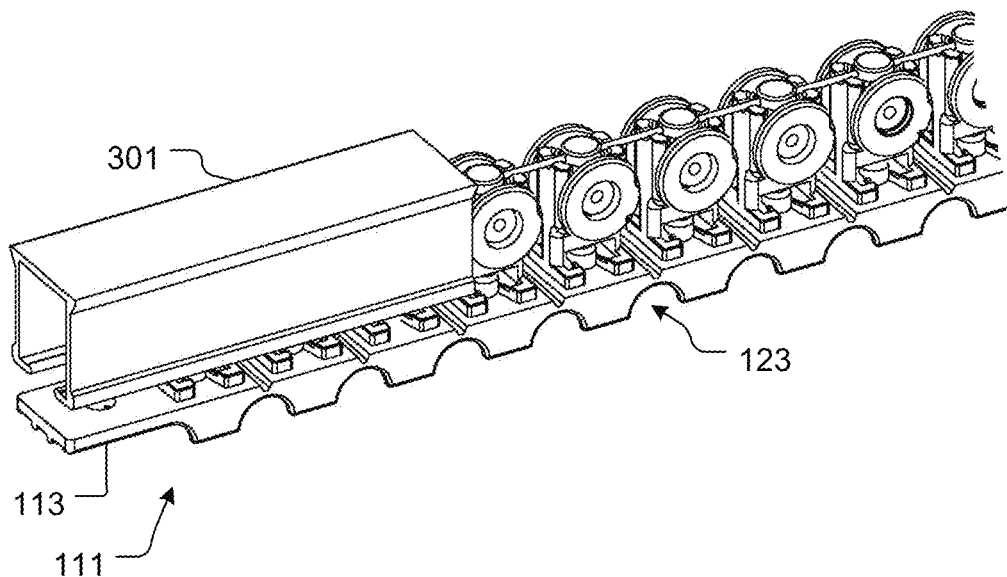
FIG. 3 is an isometric view of the system of FIG. 1 with the plurality of carriers being installed in a drapery track.

In FIG. 3 the installation system 101 is shown engaging with track 301. It should be appreciated that one of the unique features believed characteristic of the present invention is that the plurality of carriers are secured in an alignment, thereby allowing for easy engagement of the plurality of carriers with the track 301.

Figure 4:
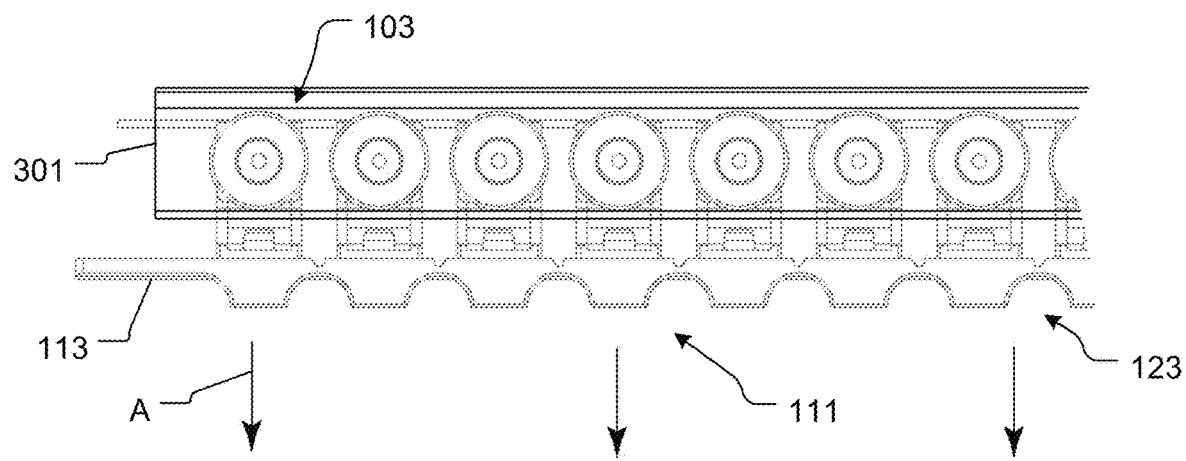
FIG. 4 is a side view depicting a downward force used to disengage the installation rack from the plurality of carriers of FIG. 3.
Figure 4:
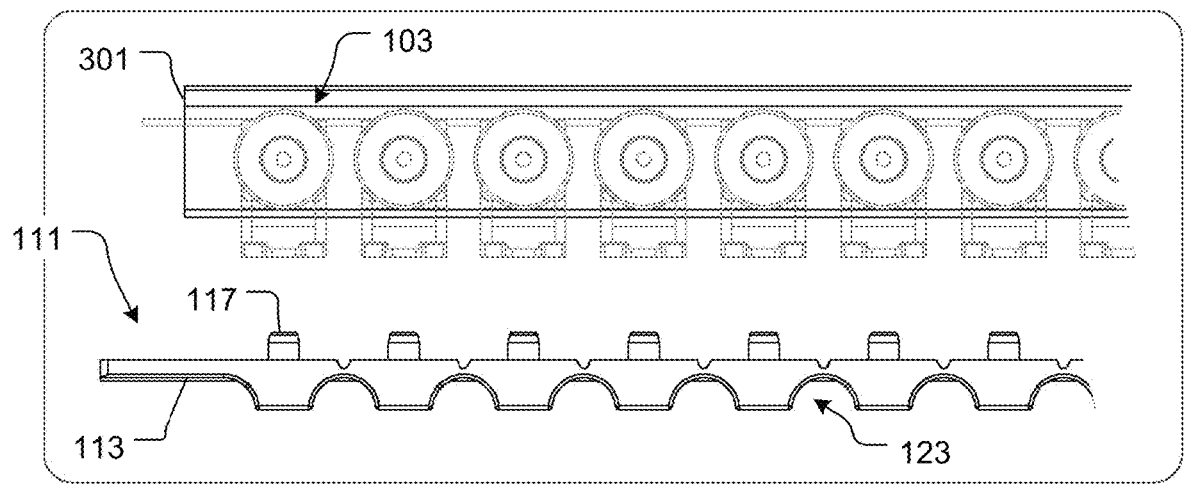

In FIG. 4, removal of the installation rack 111 is shown. As shown, once the plurality of carriers 103 are positioned within the track 301, the installation rack is removed as the plurality of buttons 117 are disengaged from the plurality of drapery carriers 103 via a downward force (A). The buttons 117 are configured to snap out of place, thereby leaving the plurality of carriers behind in the track 301 and ready for receiving a drapery.

Figure 5:
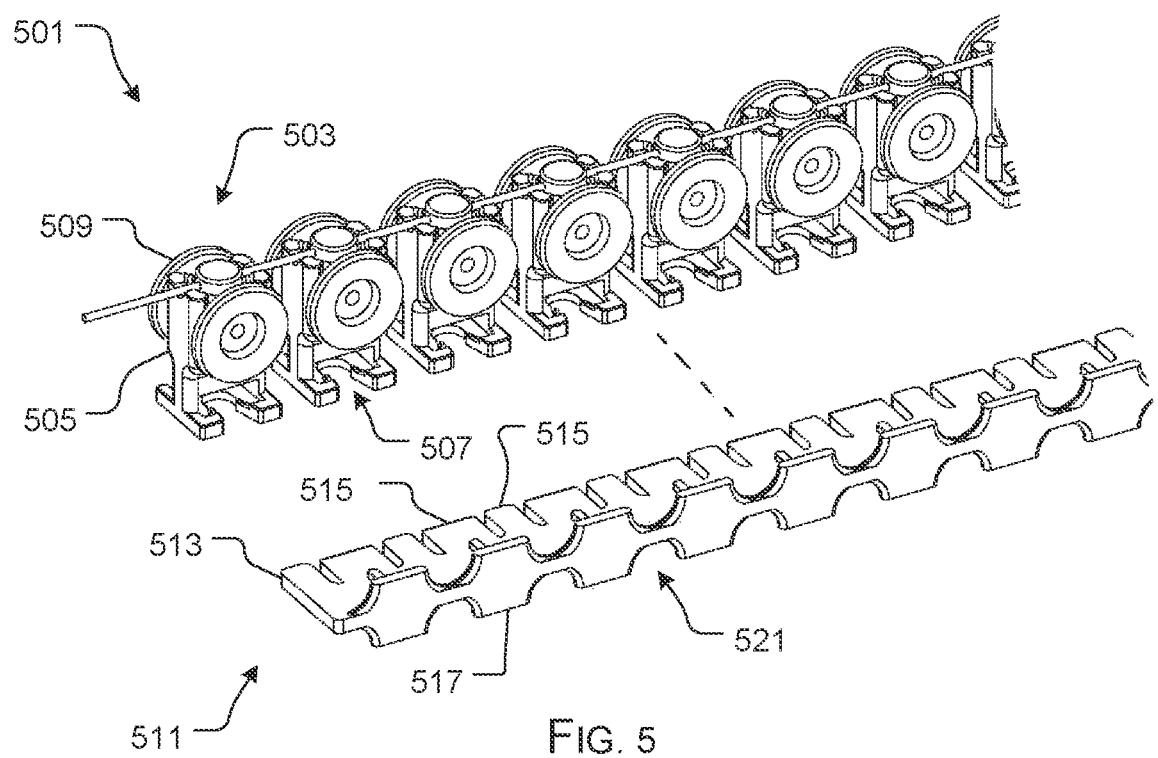
FIG. 5 is an isometric view of a drapery carrier installation system in accordance with an alternative embodiment of the present invention.
Figure 6:
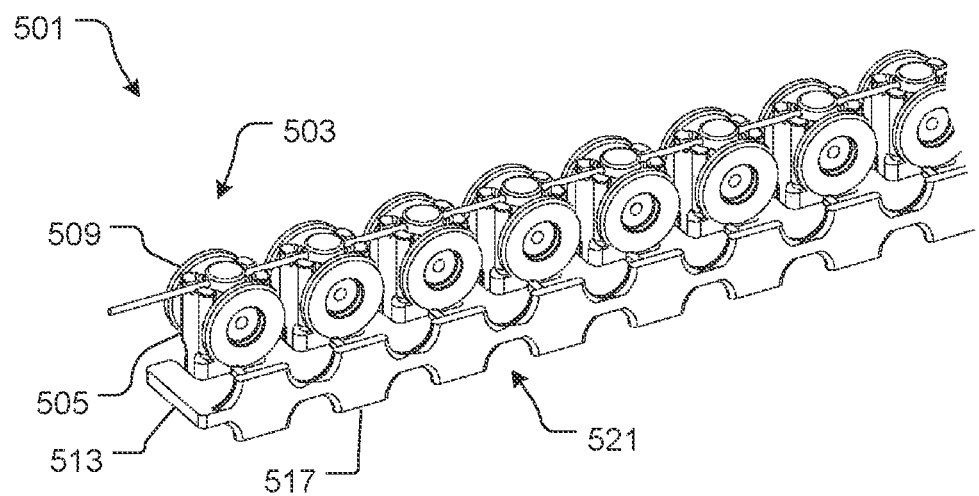
FIG. 6 is an isometric view of the system of FIG. 5 with a plurality of carriers engaged with the installation rack.
Figure 7:
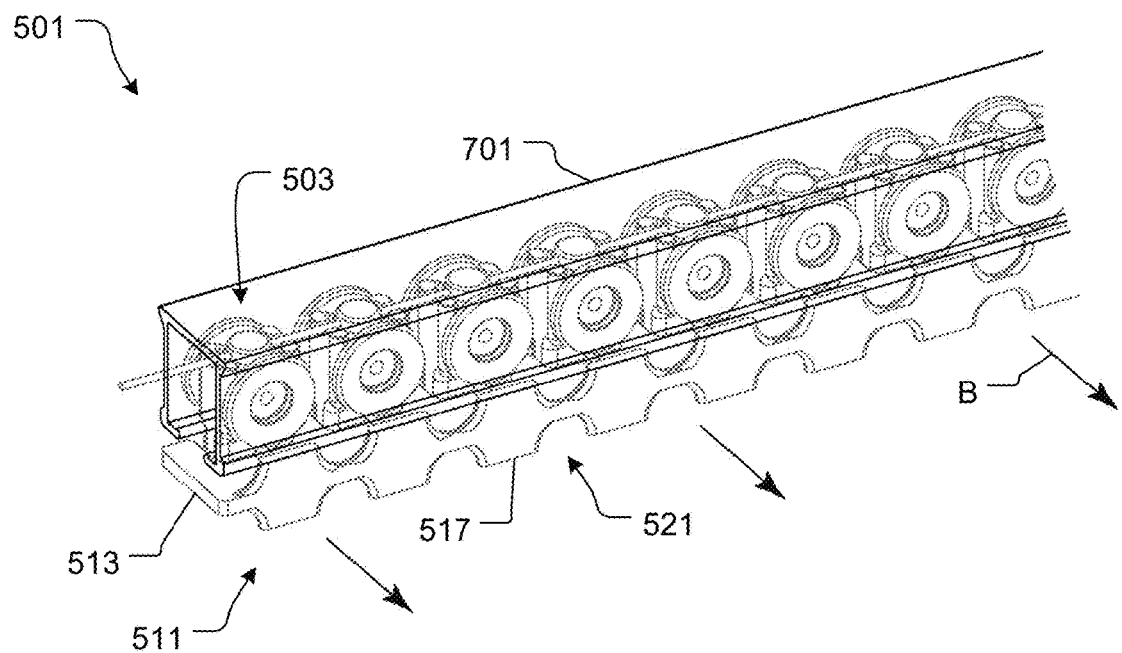
FIG. 7 depicts an isometric view of a sideways force used to disengage the installation rack from the plurality of carriers of FIG. 6.
Figure 7:
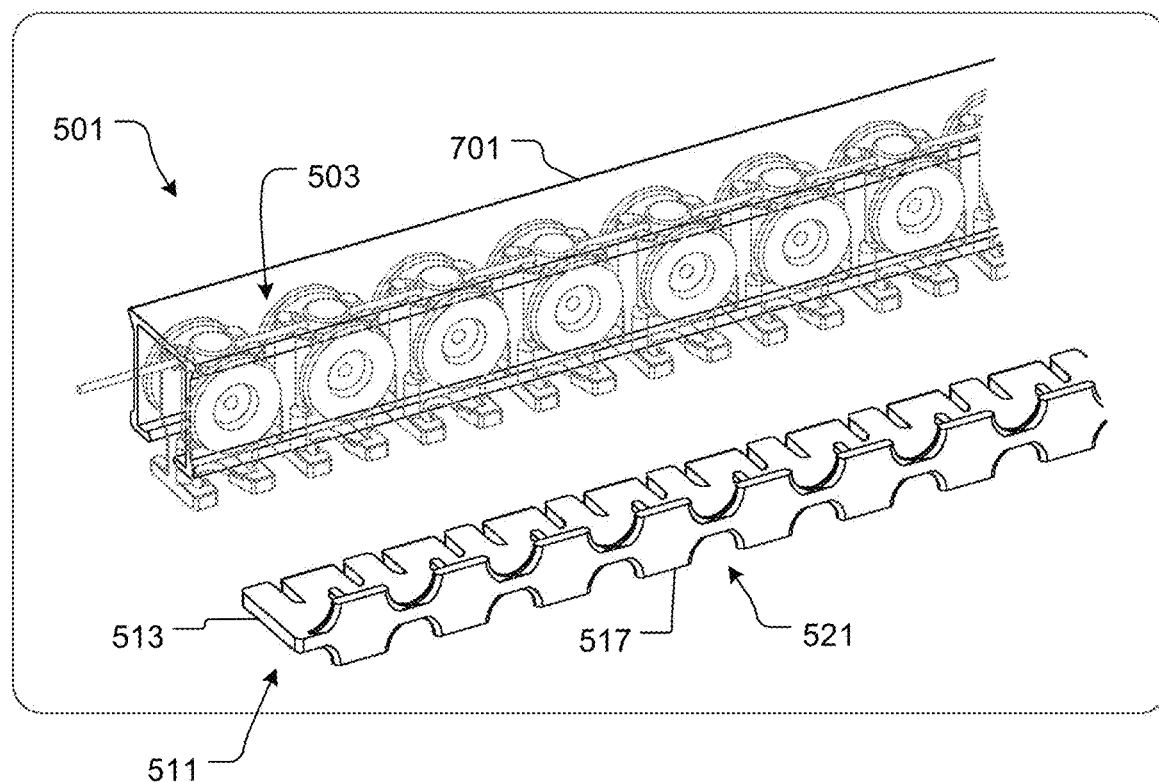

In FIGS. 5-7, an alternative embodiment of a drapery carrier installation system 501 is shown. System 501 is similar to system 101 in form and fashion, and includes a plurality of carriers 503, each having a carrier body 505 with one or more grooves 507, and one or more wheels 509 configured to engage with a drapery track 701. In this embodiment, an installation rack 511 is provided with a base plate 513 that includes a plurality of tabs 515 that extend out to the side and are configured to engage with the plurality of carriers, as shown in FIG. 6. It should be appreciated that the plurality of tabs 515 will flex to allow for attachment and removal. As shown, the installation rack 511 can further include a vertical wall 517 with a plurality of cutouts 521.

In FIG. 7, removal of the installation rack 511 is shown. As shown, in this embodiment, a sideways force (B) is applied to the installation rack 511, thereby removing disengaging the installation rack from the plurality of carriers, while leaving the plurality of carriers within the track 701 simultaneously.

Figure 8:
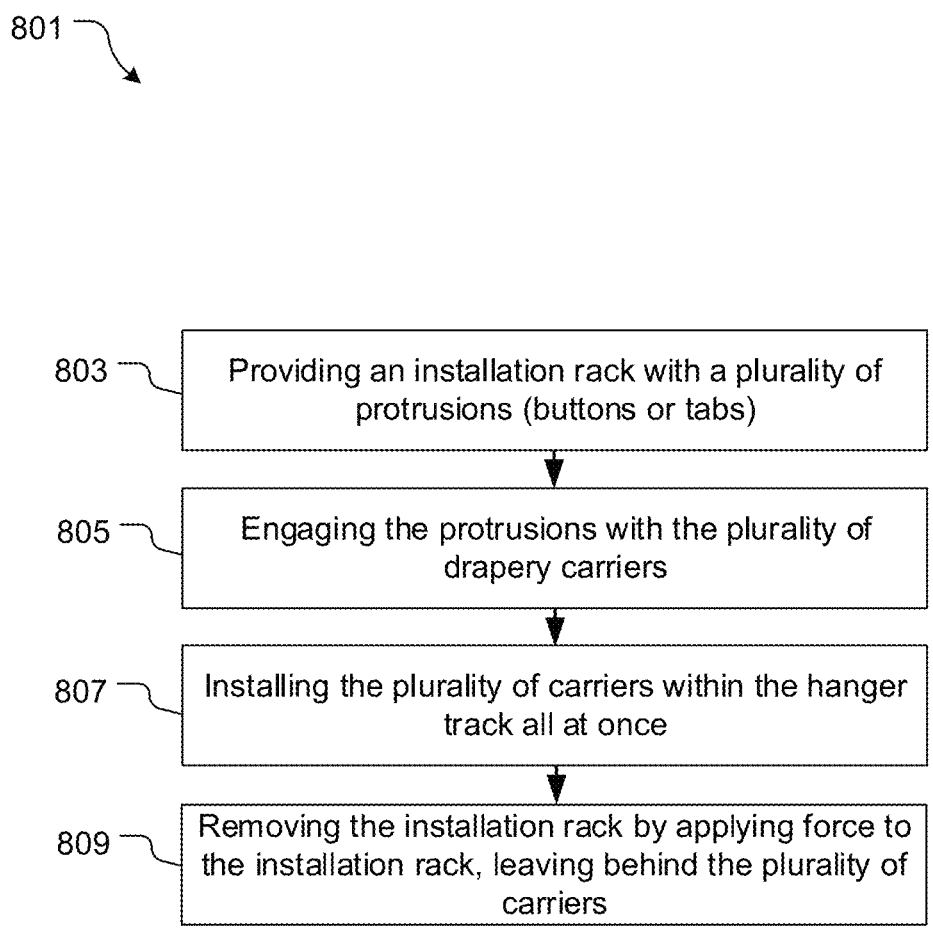
FIG. 8 is a flowchart of a method of installation in accordance with the present application.

In FIG. 8, a flowchart depicts the method of use of the installation system. During use, an installation rack with a plurality of protrusions (either buttons or tabs as described above) is engaged with a plurality of carriers, as shown with boxes 803,805. The plurality of drapery carriers are then engaged with a drapery track simultaneously, as shown with box 807. The user then applies either a sideways force or a downward force to remove the installation rack, leaving behind the plurality of carriers, as shown with box 809.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A drapery carrier installation system, comprising:
  a plurality of carriers, each having;
  a carrier body having a vertically extending portion substantially perpendicular to a horizontally extending portion;
  at least one wheel attached to the vertically extending portion configured to engage with a track; and
  at least one groove extending inward from an edge of the horizontally extending portion;
  an installation rack for holding the plurality of carriers relative to one another prior to installation, the installation rack having:
  a base plate having a plurality of sections connected together to form the base plate, the base plate forming a horizontal, substantially flat top surface, each of the plurality of sections having a button extending vertically upward, the horizontal substantially flat top surface being wholly positioned underneath the button of each section;
  wherein the installation rack is configured to be attached to the plurality of carriers by the buttons engaging the at least one groove, and the substantially flat top surface abutting the horizontal portions of the carriers;
  and wherein the installation rack is configured to be removed by disengaging the button from the at least one groove.

* * * * *